United States Patent [19]
Scott et al.

[11] Patent Number: 6,144,190
[45] Date of Patent: Nov. 7, 2000

[54] ENERGY CONVERSION SYSTEM EMPLOYING STABILIZED HALF-BRIDGE INVERTER

[75] Inventors: Harold C. Scott; Rod K. Shelden, both of Boulder, Colo.

[73] Assignee: Coleman Powermate, Inc., Kearney, Nebr.

[21] Appl. No.: 09/276,615

[22] Filed: Mar. 25, 1999

[51] Int. Cl.[7] .................................................. H02P 9/44
[52] U.S. Cl. .............................................. 322/25; 322/46
[58] Field of Search .................................. 322/17, 20, 22, 322/24, 25, 27, 28, 29, 46

[56] References Cited

U.S. PATENT DOCUMENTS

| | | | |
|---|---|---|---|
| 3,775,663 | 11/1973 | Turnbull | 321/9 A |
| 4,045,718 | 8/1977 | Gray | 320/17 |
| 4,456,870 | 6/1984 | Rodari | 322/29 |
| 4,564,895 | 1/1986 | Glennon | 363/41 |
| 4,788,486 | 11/1988 | Mashino et al. | 320/17 |
| 4,814,962 | 3/1989 | Magalhaes et al. | 363/16 |
| 4,833,584 | 5/1989 | Divan | 363/37 |
| 4,992,920 | 2/1991 | Davis | 363/36 |
| 5,214,371 | 5/1993 | Naidu | 322/29 |
| 5,253,157 | 10/1993 | Severinsky | 363/98 |
| 5,254,936 | 10/1993 | Leaf et al. | 322/90 |
| 5,444,355 | 8/1995 | Kaneyuki et al. | 322/58 |
| 5,512,811 | 4/1996 | Latos et al. | 322/10 |
| 5,581,168 | 12/1996 | Rozman et al. | 318/723 |
| 5,625,276 | 4/1997 | Scott et al. | 322/24 |
| 5,886,504 | 3/1999 | Scott et al. | 322/15 |
| 5,900,722 | 5/1999 | Scott et al. | 322/46 |
| 6,049,195 | 4/2000 | Geis et al. | 322/46 |

*Primary Examiner*—Nick Ponomarenko
*Attorney, Agent, or Firm*—Michael A. Lechter; William R. Bachand; Squire, Sanders & Dempsey

[57] ABSTRACT

An improved three-phase bridge inverter DC link converter power circuit for a portable generator, preferably the generator system described in U.S. Pat. No. 5,625,276 to Scott et al. Dual voltage and variable frequency inverter designs and improved converter designs are disclosed. Embodiments of the present invention avoid a capacitor induced center voltage drift problem found in certain prior art inverter designs.

9 Claims, 9 Drawing Sheets

ENERGY CONVERSION SYSTEM EMPLOYING STABILIZED HALF-BRIDGE INVERTER

BACKGROUND OF THE INVENTION

This invention relates to motor generator equipment for transforming mechanical power into regulated power using on electronic power converter and, in particular, a half-bridge inverter for providing a generally sinusoidal output and a stabilized neutral node suitable for use in lightweight portable generator systems, such as, for example, the type disclosed in commonly assigned U.S. Pat. No. 5,625,276 to Scott et al., filed Jan. 9, 1995, and various commonly assigned, co-pending applications.

Commonly assigned and co-pending application U.S. Ser. No. 08/752,230 now U.S. Pat. No. 5,886,504, by Scott, et al. filed on Nov. 19, 1996 entitled "Throttle Controlled Generator", describes among other things, a lightweight, compact power conversion system employing an engine and an alternator capable of providing a regulated voltage regardless of engine speed and load current fluctuations. One of the embodiments described there provides a relatively high voltage, low current AC output suitable for powering lighting and appliances, a relatively high current output suitable for battery charging and starting vehicles, and an output suitable for arc welding. That system includes an alternator having multiple stator windings, one or more switching rectifier circuits, an inverter, and a controller. In general, alternator windings produce a signal (typically multi-phase) that is applied to a switching rectifier suitably configured as a plurality of switching rectifier circuits, to generate one or more uni-polar voltages (generally, "DC rail voltages," or "DC rails"). One or more DC rail voltages may be provided to the inverter to generate an output voltage having a sinusoidal waveform. The controller (e.g., a microprocessor based circuit) selectively activates and deactivates the various windings, provides control signals to the switching rectifier circuits to maintain the desired DC rail voltages, and operates the inverter to maintain output voltages under varying load conditions.

Commonly assigned and co-pending applications by Scott et al., U.S. Ser. No. 08/370,577 now U.S. Pat. No. 5,625,276, filed Jan. 9, 1995, Ser. No. 08/695,558 now U.S. Pat. No. 5,900,722, filed Aug. 12, 1996, and Ser. No. 08/752,230 now U.S. Pat. No. 5,886,504, filed Nov. 19, 1996 describe various inverters. In general, the inverters described there include a converter circuit, for example, an H-bridge configuration of switching devices. Each switching device couples one of two DC rail signals to one of two juncture nodes. Each juncture node is coupled to an inverter output terminal. One of the DC rails is considered a common rail, being negative or of lower potential relative to the other DC rail. Each switching device is responsive to a respective drive signal. The magnitude of the voltage between the juncture nodes is controllably varied to create a predetermined waveform at the inverter output terminals (e.g., a simulated sine waveform). Various mechanisms are described there for varying the voltages of the juncture nodes relative to the common rail.

The aforementioned commonly assigned U.S. Pat. No. 5,625,276, issued Apr. 29, 1997, and the commonly assigned U.S. patent application Ser. Nos. 08/752,230, 08/370,577, and 08/695,558, now U.S. Pat. Nos. 5,886,504, 5,625,276, and 5,900,722, are incorporated herein by reference.

In general, half-bridge converter circuits are known. Examples of such half-bridge converters are described in U.S. Pat. No. 5,253,157, issued on Oct. 12, 1993 to Severinski; U.S. Pat. No. 3,775,663, issued Nov. 27, 1973 to Turnbull; U.S. Pat. No. 4,564,895, issued Jan. 14, 1986 to Glennon; U.S. Pat. No. 4,833,584 issued May 23, 1989 to Divan; and U.S. Pat. No. 4,814,962, issued Mar. 21, 1989 to Magalhaes, et al. See also *Power Electronics, Converters, Applications, and Design*, 2nd Edition, by Mohan et al., John Wiley & Sons, Inc., 1995; and *Design of Solid-state Power Supplies*, 2nd Edition, by Eugene R. Hnatek, Van Nostrand Reinhold, 1981.

Referring briefly to FIG. 1, a conventional half-bridge inverter 100 typically comprises respective switching devices S104 and S106, capacitors C108 and C110, and a suitable filter F116. Switching devices S104 and S06 (for example, contactors, semiconductor devices, or switching circuits) are connected in series between a relatively positive DC rail RL1, and a relatively negative DC rail RL3, with a juncture node J121 therebetween. Capacitors C108 and C110 are likewise connected in series between DC rails RL1 and RL3, and define a juncture node J122 therebetween. A juncture node (or simply juncture) is any nominal point of electrical connection, for example an output node of a bridge circuit. Anti-parallel diodes are typically included in switching devices S104 and S106 for eliminating reverse voltage breakdown failures of components of the switching devices. Capacitors C108 and C110 are of equal and sufficiently large capacitance to provide current through load Z150 when a circuit through one of the switching devices is completed.

Switching devices S104 and S106 are rendered conductive and non-conductive by drive signals DS104 and DS106 to selectively connect DC rail RL1 or RL3 to juncture J121 and generate a pulse width modulated (PWM) signal at juncture J121 relative to DC rail RL3. The PWM signal has a constant frequency and constant amplitude when "on"; however, the duty cycle varies suitably from one period to the next according to predetermined samples of a symmetric sinusoidal waveform. A PWM signal is conventionally averaged by a low-pass filter to recover the sinusoidal waveform. Such a filter averages the "on" and "off" portions of each period. For example, filter F116 is a single-stage passive LC network having inputs connected to junctures J121 and J122 and having outputs connected to output terminals T118 and T119. After filtering by filter F116, the inverter output signal $V_{out}$ at terminals T118 and T119 is provided across load Z150 with a relatively accurate sinusoidal waveform.

Capacitors C108 and C110 conduct currents of the PWM signal to rails RL1 and RL3. Consequently, the voltage at juncture J122, relative to common rail RL3, is biased about a midpoint reference voltage of approximately one half of the potential between DC rails RL1 and RL3. The voltage at juncture J121 referenced to juncture J122 has a PWM waveform with pulses above and below the mid-point voltage. The filtered voltage appearing across load Z150 has a symmetric sinusoidal waveform without the bias.

In half-bridge inverter applications in the prior art, there remain problems associated with maintaining both the rectified DC level $V_{in}$ across terminals T101 and T102 and maintaining symmetry of the voltage waveform at juncture J122 about the mid-point reference voltage. As a consequence, the magnitude of the output voltage $V_{out}$ becomes unstable and generally decreases in magnitude. Further the signed NEUT terminal T119 varies in absolute voltage and is no longer reliable as a stable neutral node.

Unequal time constants associated with capacitors C108 and C110 in combination with response timing errors in switching devices S104 and S106 lead to voltage drift at juncture J122 from the mid-point reference voltage. Analysis has shown that drift from the mid-point reference voltage can arise from manufacturing tolerances, can increase with aging (of capacitors, switching devices, and loads), and can change with changes in load Z150. At typical line operating frequencies (e.g., 50, 60, and 400 Hz) and typical load currents, the capacitance of capacitors C108 and C110 is required to be particularly large, for example on the order of several Farads for an output of only a few Amperes at 60 Hz. Capacitors of this magnitude are prohibitively expensive for many applications and unwieldy in physical size and weight for many portable applications. Non-uniform aging is more likely with larger capacitance capacitors, exacerbating voltage drift.

It is, in general, known that the voltage at juncture J122 can be stabilized to reduce drift by employing a further set of switching devices that selectively couple an inductor across one or the other of the capacitors. However, increased circuit complexity adversely affects product prices and increases maintenance and repair costs.

It is desirable that an inverter provide substantial current at a stable output voltage and a designated output frequency economically at operating switching frequencies compatible with available switching devices. Voltage drift adversely affects the magnitude of the output voltage, consequently disturbs current through load Z150, and generally degrades operating functions of the load. Voltage drift can also lead to conditions that are unsafe for personnel and equipment.

SUMMARY OF THE INVENTION

The present invention provides a particularly advantageous energy conversion system of the type including an alternator having a rotor and a stator with at least one stator winding, a motive source, e.g. an engine, for effecting movement of the rotor, a switching rectifier circuit, and an inverter circuit. The rectifier circuit, in response to the current induced in the stator windings, generates a uni-polar voltage between relatively positive and relatively negative rails. Particular advantages are obtained through the use of a half-bridge inverter circuit comprising: first and second switching devices connected in series between the relatively positive and relatively negative rails with a first juncture therebetween; first and second capacitors connected in series between the relatively positive and relatively negative rails with a second juncture therebetween; and a filter coupled across the first and second junctures. The controller generates control signals for the inverter circuit switching devices such that the switching devices are rendered conductive and non-conductive to selectively couple one or the other of the relatively positive and relatively negative rails to the first juncture and generate a pulse width modulated (PWM) signal at the first juncture relative to the second juncture.

The capacitors conduct currents of the PWM signal, returning the currents to the relatively positive and relatively negative rails. The averaging effect of the capacitors combines to produce a mid-point reference voltage at the second juncture, resulting in an output signal having a desired bi-directional PWM voltage waveform about the mid-point reference voltage.

A filter produces an output signal from the bi-directional pulse width modulated signal. The output signal has a desired symmetric voltage waveform about a mid-point reference voltage. Drift of the output voltage with respect to the mid-point reference voltage is minimized by coupling a voltage reference circuit to the second juncture.

In one embodiment, drift is avoided by employing an alternator including a multi-phase stator winding, and a full-controlled rectifier bridge. The respective phases of the stator winding are connected at a neutral point. An electrical connection is provided between the neutral point and the second juncture. In a variation, switching rectifiers are controlled in response to an output of the inverter circuit.

In another embodiment, voltage drift is avoided by employing an alternator which includes at least first and second stator windings, and a switching rectifier circuit which includes first and second rectifier bridges. The rectifier bridges are receptive of currents induced in the first and second stator windings, respectively, and are connected between the relatively positive and relatively negative rails to provide an intermediate rail voltage between an intermediate rail and the relatively negative rail. An electrical connection is provided between the intermediate rail and the second juncture. By generating an appropriate intermediate rail voltage, voltage drift is reduced or cancelled. In a variation, switching rectifiers are controlled in response to an output of the inverter circuit.

An inverter circuit in one embodiment of the present invention includes a controller that responds to a feedback signal, for example, an inverter output voltage. In response to the feedback signal, the controller provides drive signals and/or switching rectifier control signals.

In accordance with another aspect of the invention, multiple output voltages are provided. For example, third and fourth switching devices are included in the inverter circuit and connected in series between the relatively positive and relatively negative rails with a third juncture therebetween. A second filter is coupled across the second and third junctures. The controller generates the control signals to the third and fourth inverter circuit switching devices such that the switching devices are rendered conductive and non-conductive to selectively connect one or the other of the relatively positive and relatively negative rails to the third juncture and generate a pulse width modulated signal at the third juncture relative to the second juncture. The pulse width modulated signals at the first and third junctures are demodulated by the integrating action of the first and second capacitors. The first and second filters provide respective smoothed output voltage waveforms with reference to the second juncture. The controller receives one or both filtered output voltages as feedback.

BRIEF DESCRIPTION OF THE DRAWING

Preferred exemplary embodiments of the present invention will hereinafter be described in conjunction with the appended drawing wherein.

DETAILED DESCRIPTION OF THE PREFERRED EXEMPLARY EMBODIMENTS

Figure 2:
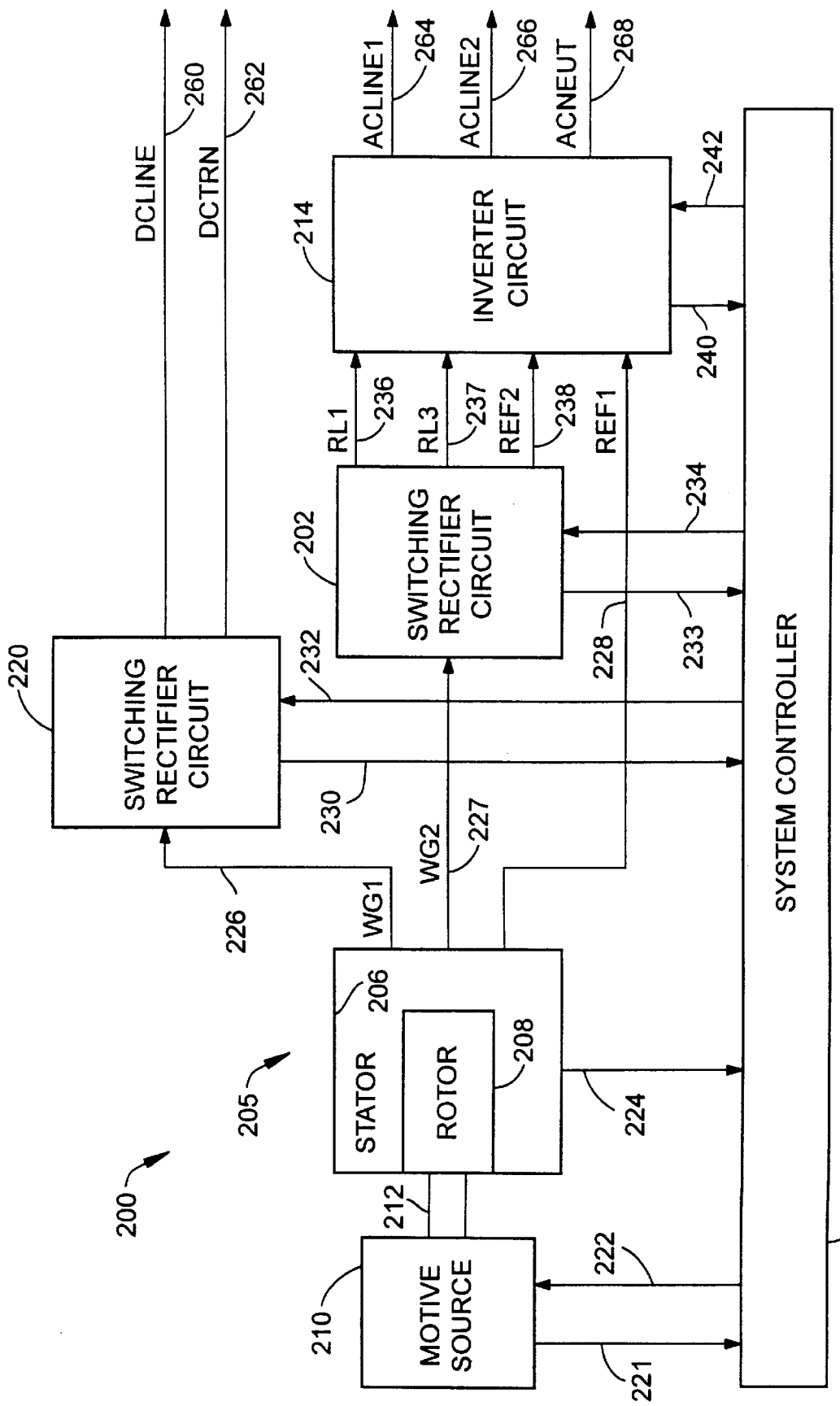
FIG. 2 is a functional block diagram of an energy conversion system in one embodiment of the present invention.

Particular synergies can be obtained by employing a half-bridge inverter in a lightweight portable energy conversion system with multiple stator windings such as described in the aforementioned U.S. patents and applications by Scott et al. An energy conversion system according to various aspects of the present invention converts rotational mechanical energy to an output electrical AC voltage with voltage drift in the output signal reduced to a desirable minimum. For example, system 200 of FIG. 2 suitably comprises: motive source 210, alternator 205, switching rectifier circuits 220 and 202, inverter circuit 214, and system controller 204. In a variation, switching rectifier circuit 220 is omitted when a separate DC output is not desired.

Motive source 210 may comprise any source of rotation such as, for example, a conventional diesel engine, steam-driven turbine, or internal combustion engine. Motive source 210 suitably includes a rotational output shaft 212 that transfers power to alternator 205. Controller 204 receives engine status signals 221 representing parameters such as fuel supply, pressures, temperatures, and RPM. Such signals provide feedback for, inter alia, system control, variation in RPM, and temperature monitoring. Shaft 212 rotates at a speed in accordance with control signal 222, for example, a throttle control signal. Examples of suitable throttle control devices and signals are described in the aforementioned applications by Scott et al., and in particular, application Ser. No. 08/752,230, filed Nov. 19, 1996.

Alternator 205 converts mechanical energy, e.g., the rotation of shaft 212, into electrical energy. Alternator 205 suitably includes multi-winding stator 206 and rotor 208, disposed such that rotation of rotor 208 induces a current in the windings of stator 206. Controller 204 receives alternator status signals 224 as feedback signals for system control.

Rotor 208 is preferably a permanent magnet rotor employing high energy product magnets (e.g., having a flux density of at least on the order of 5 kilogauss) and consequence poles. Rotor 208 is of sufficiently light weight that it can be maintained in axial alignment with, and rotated in close proximity to, stator 206 with a relatively small predetermined gap in the range of, for example, 0.02 to 0.06 inch, and preferably 0.03 inch without the necessity of any bearings in addition to those conventionally included in motive source 210.

Stator 206 preferably includes a plurality of 3-phase windings which provide winding group signals for example WG1 226 and WG2 227. Windings are preferably formed with the respective coils of each phase grouped together and concurrently wound about a laminate core as a unit. Each winding includes a predetermined number of turns corresponding to the voltage output associated with that winding. Physically winding the corresponding phases of the respective windings together, ensures that the output signals therefrom are maintained in phase, and, additionally can provide particularly advantageous heat distribution/dissipation characteristics. A suitable stator is described in the co-pending application by Scott et al. Ser. No. 08/752,230, filed Nov. 19, 1996. Stator 206 also provides voltage reference signal REF1 228 to inverter circuit 214. In a variation, signal REF1 is eliminated when voltage drift in output signals 264, 266, or 268 is reduced as desired by other aspects of the present invention.

Winding group signals 226 and 227 are variously applied to switching rectifier circuits 220 and 202. Switching rectifier circuit 202 responds to control signals 234 from controller 204 to selectively effect current paths through various of the stator windings of alternator 205 and rectifiers of switching rectifier circuit 202 thereby generating one or more uni-polar DC rail signals or voltage reference signals for reducing voltage drift. Various implementations of switching rectifier circuit 202, for example using a half-bridge converter, may be advantageously employed for providing these signals. For example, DC rail signal RL1 on line 236 provides a pulsating half-sinusoid voltage of one or more overlapping sine phases as a DC rail voltage RL1 measured with reference to rail signal RL3 on line 237. Switching rectifier circuit 202 also provides voltage reference signal REF2 on line 238 to inverter circuit 214. In a variation, signal REF2 is eliminated when voltage drift in output signals 264, 266, or 268 is reduced as desired by other aspects of the present invention. If utilized, switching rectifier circuit 220 is preferably similar in structure and operation to switching circuit 202 and provides one or more uni-polar output signals DCLINE on line 260 and DCRTN on line 262. Signal DCLINE on line 260 is a low voltage high current signal measured with respect to signal DCRTN on line 262, suitable for battery charging operations. Suitable switching rectifier circuitry is described in co-pending application by Scott et al., Ser. No. 08/752,230, filed Nov. 19, 1996. Controller 204 may receive status signals (for example, zero crossing, winding group phase angle, output voltage, output current, over-voltage, and over-current signals) on lines 230 and 233 respectively from switching circuits 220 and 202 as feedback signals for system control.

Controller 204 may be any device capable of providing suitable control signals to the various components of system 200. Controller 204 preferably comprises a microcomputer-based circuit which receives one or more feedback signals from the system components, and accordingly generates control signals to switching rectifier circuits 220 and 202 and to inverter circuit 214. Feedback signals from the system components may include, for example, signals indicative of alternator temperature or RPM, rail signal voltages, and inverter output voltages. Controller 204 performs methods according to various aspects of the present invention to reduce voltage drift in inverter output signals ACLINE1 on line 264, ACLINE2 on line 266, and ACNEUT on line 268.

Inverter circuit 214 preferably includes a conventional half-bridge inverter circuit adapted according to aspects of the present invention. Inverter circuit 214 receives uni-polar inverter rail voltages RL1 and RL3 and provides one or more AC output signals ACLINE1 and ACLINE2 referenced to signal ACNEUT. Inverter circuit 214 also provides signals 240 as feedback to system controller 204. Signals 240 may include signals responsive to loading of inverter circuit output signals ACLINE1, ACLINE2, and ACNEUT, may include a measure of load current imbalance, voltage drift, over-voltage, over-current, harmonic content, and monitors of reference signals provided by other system components such as signals REF1 on line 228 and REF2 on line 238. System controller 204 responds to signals 240 and other feedback signals to provide inverter circuit control signals 242.

Figure 3:
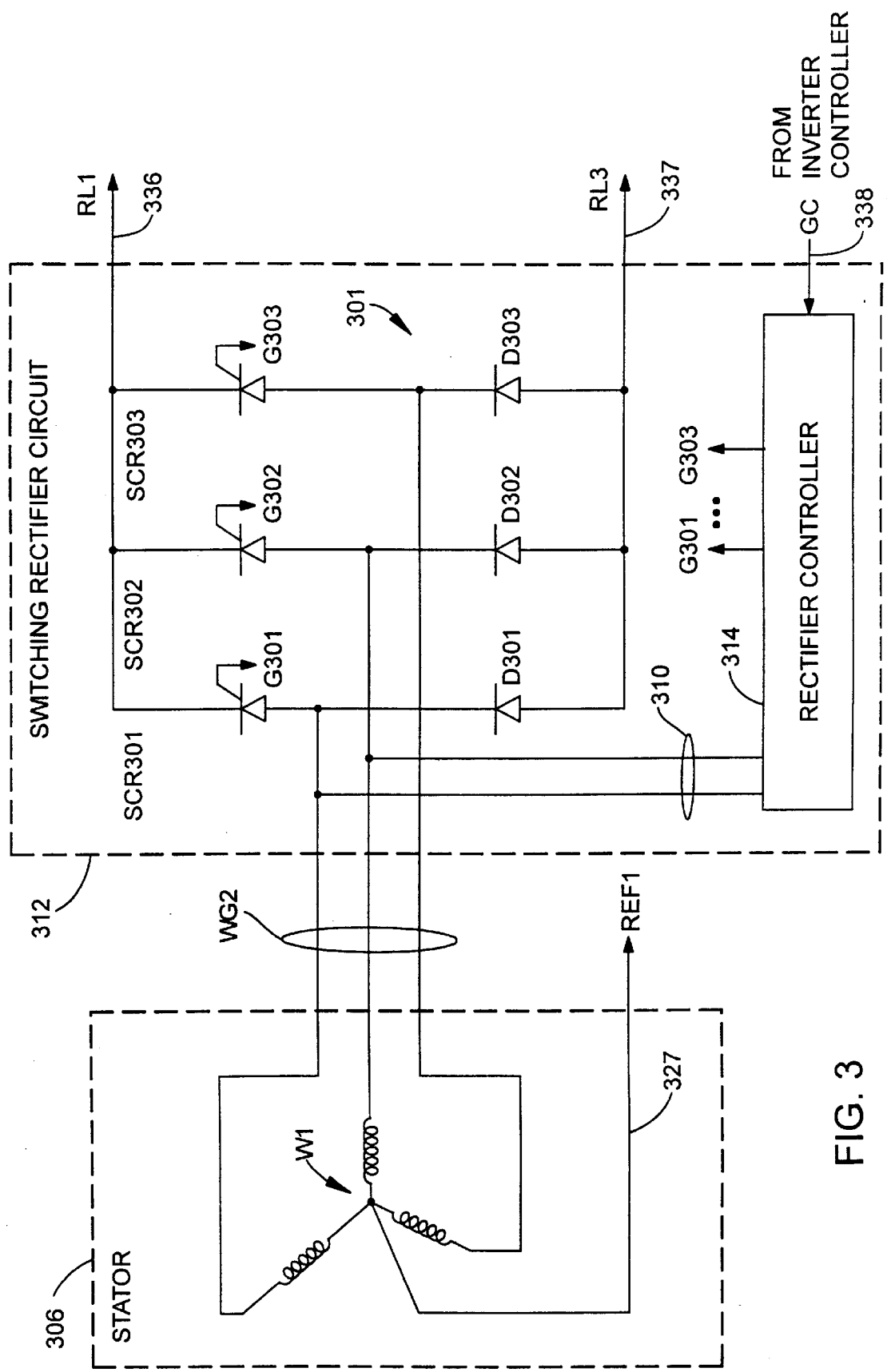
FIG. 3 is a schematic diagram of portions of a stator and a switching rectifier circuit in a variation of the system of FIG. 2.
Figure 4:
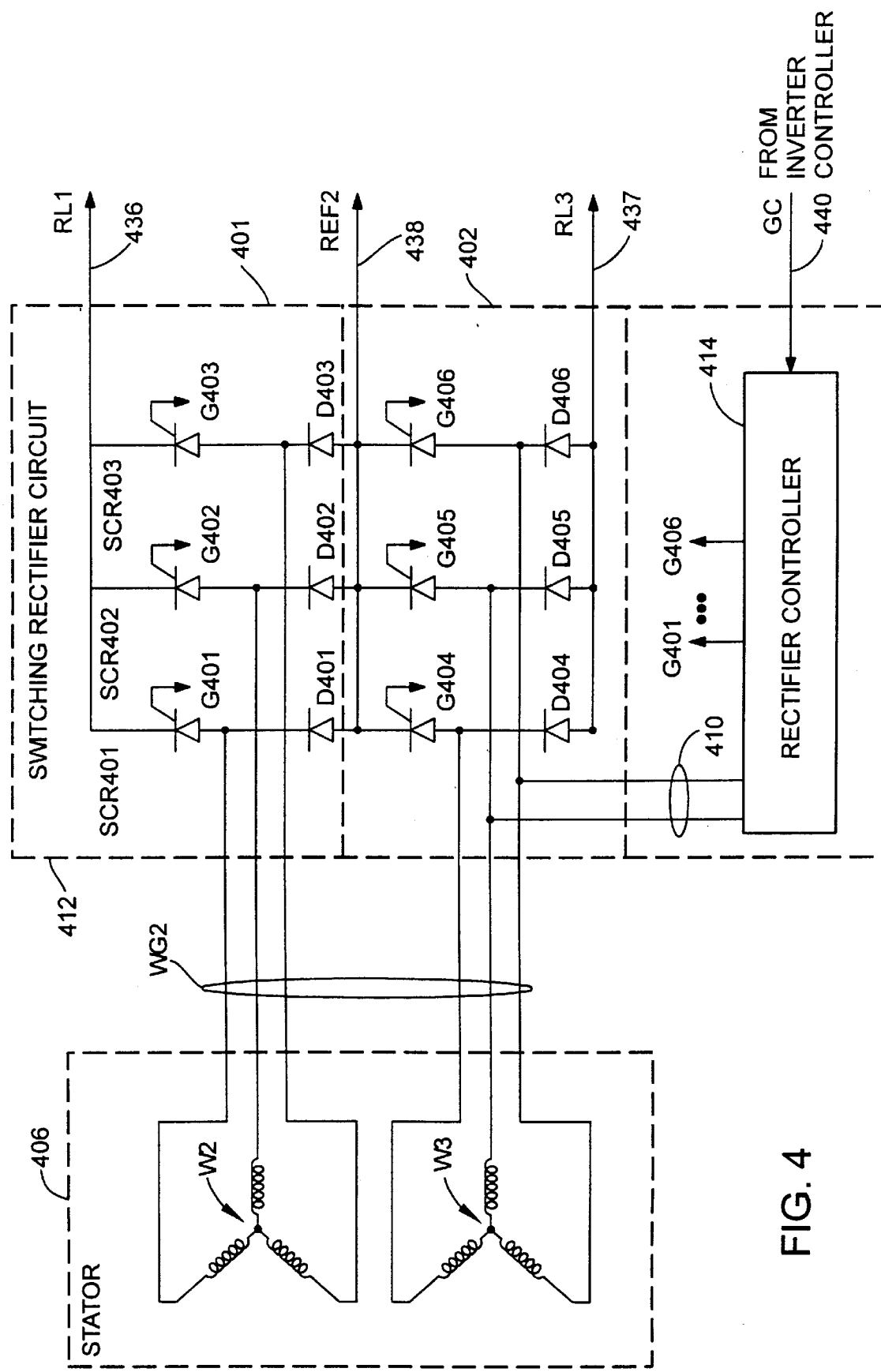
FIG. 4 is a schematic diagram of portions of a stator and a switching rectifier circuit in another variation of the system of FIG. 2.

The cooperation of stator 206 and switching rectifier circuit 202 may be better understood in view of two variations respectively shown in FIGS. 3 and 4. Referring to FIG. 3, portion 306 of stator 206 includes winding group W1, a 3-phase wye-connected winding having a neutral node 327. Reference signal REF1 is provided on node 327 for reducing inverter output voltage drift.

Winding W1 provides winding group signals WG2 (in this example) to switching rectifier circuit 202, a portion 312 of which includes a half-controlled 3-phase bridge 301 and rectifier controller 314. Bridge 301 includes silicon-controlled rectifiers (SCRs) SCR301, SCR302, and SCR303, each having a gate input responsive to a gate signal G301, G302, and G303, respectively. Diodes D301, D302, and D303 complete the conventional half-controlled bridge configuration, being respectively in series with similarly identified SCRs.

Rectifier controller 314, which may be independent or part of system controller 204, receives timing signals 310 from signals WG2 and provides gate signals G301, G302, and G303 for supplying a uni-polar voltage RL1 on line 336 with reference to return signal RL3 on line 337. Rectifier controller 314 may receive gate control feedback signal GC on line 338 for pulse population modulation or increasing or decreasing firing angles of SCRs SCR301 through SCR303 to maintain the voltage of signal RL1.

Referring now to FIG. 4, portion 406 of stator 206 includes winding groups W2 and W3, each being a 3-phase wye-connected winding. Winding groups W2 and W3 provide winding group signals WG2 (in this alternative example to the circuit of FIG. 3) to switching rectifier circuit 202, a portion 412 of which includes half-controlled 3-phase bridges 401 and 402. Bridge 401 includes SCRs SCR401, SCR402, and SCR403, each having a gate input responsive to a gate signal G401, G402, and G403, respectively. Diodes D401, D402, and D403 complete the conventional half-controlled bridge configuration, being respectively in series with similarly identified SCRs. Bridge 402 includes SCRs SCR404, SCR405, and SCR406, each having a gate input responsive to a gate signal G404, G405, and G406. Diodes D404, D405, and D406 complete the conventional half-controlled bridge configuration, being respectively in series with similarly identified SCRs.

Rectifier controller 414, which may be independent or part of system controller 204, receives timing signals 410 from signals WG2 and provides gate signals G401 through G406 for supplying a positive uni-polar voltage RL1 on line 436 with reference to line 438, and a negative uni-polar voltage RL3 on line 437 also with reference to line 438. Rectifier controller 414 may receive gate control feedback signal GC on line 440 for pulse population modulation or increasing or decreasing firing angles of any of SCRs SCR401 through SCR406 to maintain the voltage of each signal RL1 and RL3. The use of commonly wound windings and similar bridges 401 and 402 to generate the respective rail voltages RL1 and RL3 provides a reference signal REF2 at relatively little additional expense. Thus, a primary disadvantage of half-bridge inverters is overcome without requiring extensive additional circuitry or power supplies.

Bridges 401 and 402 are suitably identical, and controlled such that the magnitudes of the respective rail voltages are equal (|RL1|=|RL2|) and the voltage at rail 438 is equal to the midpoint of the voltage between rails RL1 and RL3, for example zero when RL1=−RL3 or ½ RL1 when RL3 is zero. Use of substantially identical bridges 401 and 402 and common control signals for the positive and negative sides of each phase is particularly suited for use in connection with low cost microcontrollers where control signal outputs may be at a premium. Differences in corresponding gate signals (G401 and G404, for example) account for any differences in phase of windings W2 and W3, any asymmetries in components and circuit layout in bridges 401 and 402, and any difference between the absolute values of voltages RL1 and RL2. In addition, if the voltage of signal REF2 differs from a predetermined value (e.g. earth ground or system neutral) respective gate signals for bridge 401 may differ from bridge 402 for one or more selected phases.

In FIGS. 3 and 4, gate signals are suitably of relatively short duration and may be asynchronous (random) relative to the 3-phase signal from stator windings 206. In a variation supporting asynchronous gate signals, signals 310 and 410 are omitted. Preferably, the duration of a gate signal is just sufficient to reliably fire the SCR (e.g., in the range of 5–50 microseconds, and typically in the range of 20–50 microseconds depending upon the sensitivity of the SCR). In one variation, preferred for simplicity, a negative current is applied to the gate of each SCR in response to application of a gate signal. The most negatively biased SCR (corresponding to the most negative phase at that instant in time) is rendered conductive (fires). That SCR remains conductive until commutated off by a zero-crossing of the voltage of the particular phase of the input signal associated with that SCR.

Generally, a gate signal is sufficiently short, and the phases of the alternator output such, that only a single uni-polar output pulse is provided at rail RL3 per gate signal. Accordingly, pulse population modulation may be used to control DC rail voltage. For example, by varying the number of times each gate signal is generated during a given period of time (e.g. a half cycle of the inverter circuit output signal ACLINE1), the pulse population (number of pulses during the given period) of uni-polar output pulses, and hence the average voltage of signal RL1 or RL3, can be increased or decreased. The number of pulses generated per unit time is suitably controlled by generating pulses on a periodic basis and varying the delay between successive pulses. In other words, increasing the delay will decrease the number of pulses per unit time and decreasing the delay will increase the number of pulses per unit time. In general, a suitable pulse population modulation process is described in the aforementioned co-pending application Ser. No. 08/752,230 by Scott et al. filed on Nov. 19, 1996. Any conventional software or circuit version of the process described there can be utilized in the present case. Alternatively, or in combination with pulse population modulation, pulse width modulation can be effected by varying the timing of the gate signal (the firing angle) relative to the zero-crossing.

Alternator 205 preferably generates (even at idle speed) winding group signals having a frequency higher than the frequency of inverter circuit 214 output signals ACLINE1 or ACLINE2. For example, when the frequency of a winding signal of winding group WG2 is 8 times the frequency of signal ACLINE1, each SCR may commutate 8 times to provide 8 unipolar pulses for signal RL1 during each half cycle of the inverter.

Figure 1:
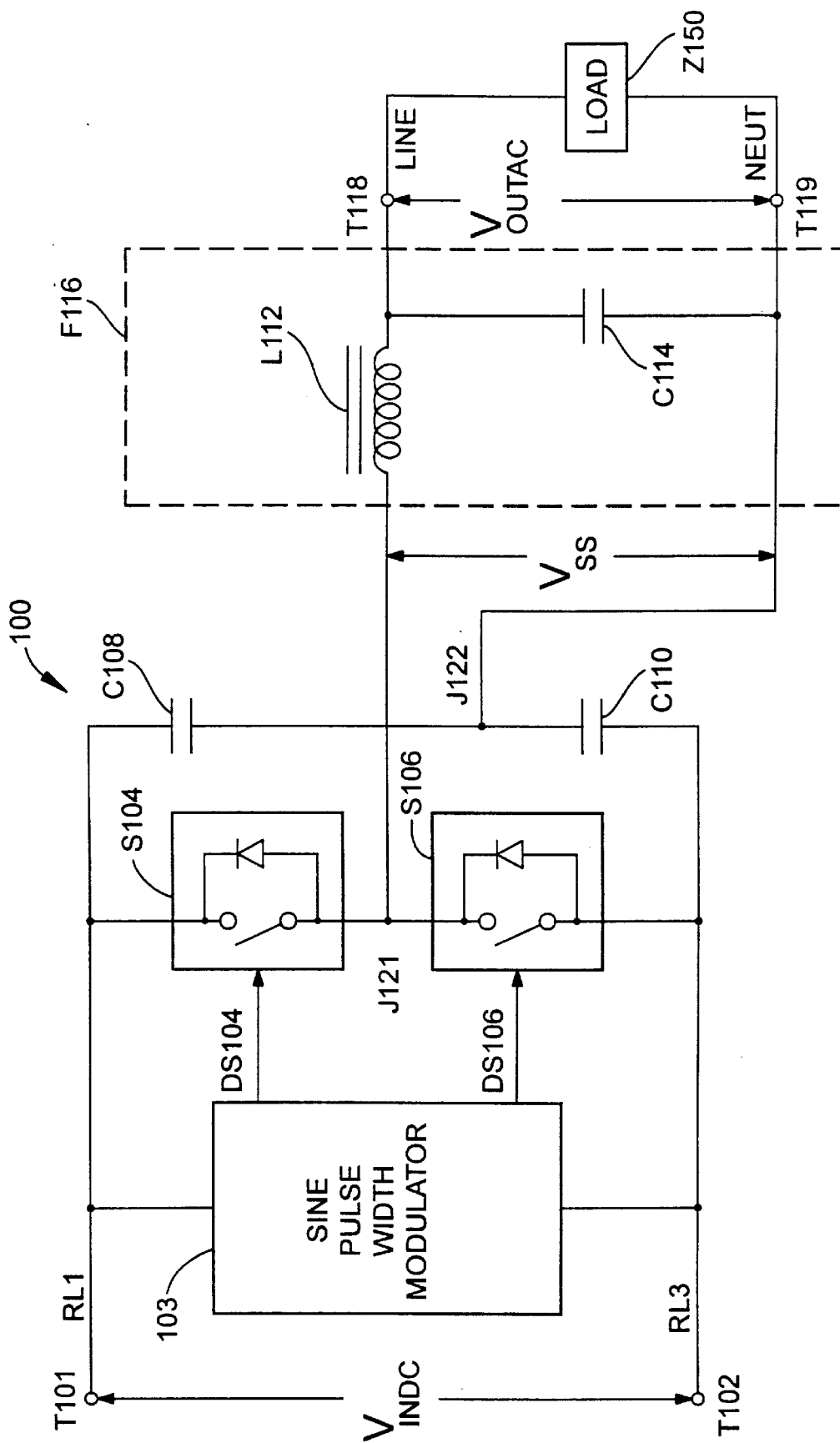
FIG. 1 is a schematic diagram of a prior art half-bridge inverter.
Figure 5:
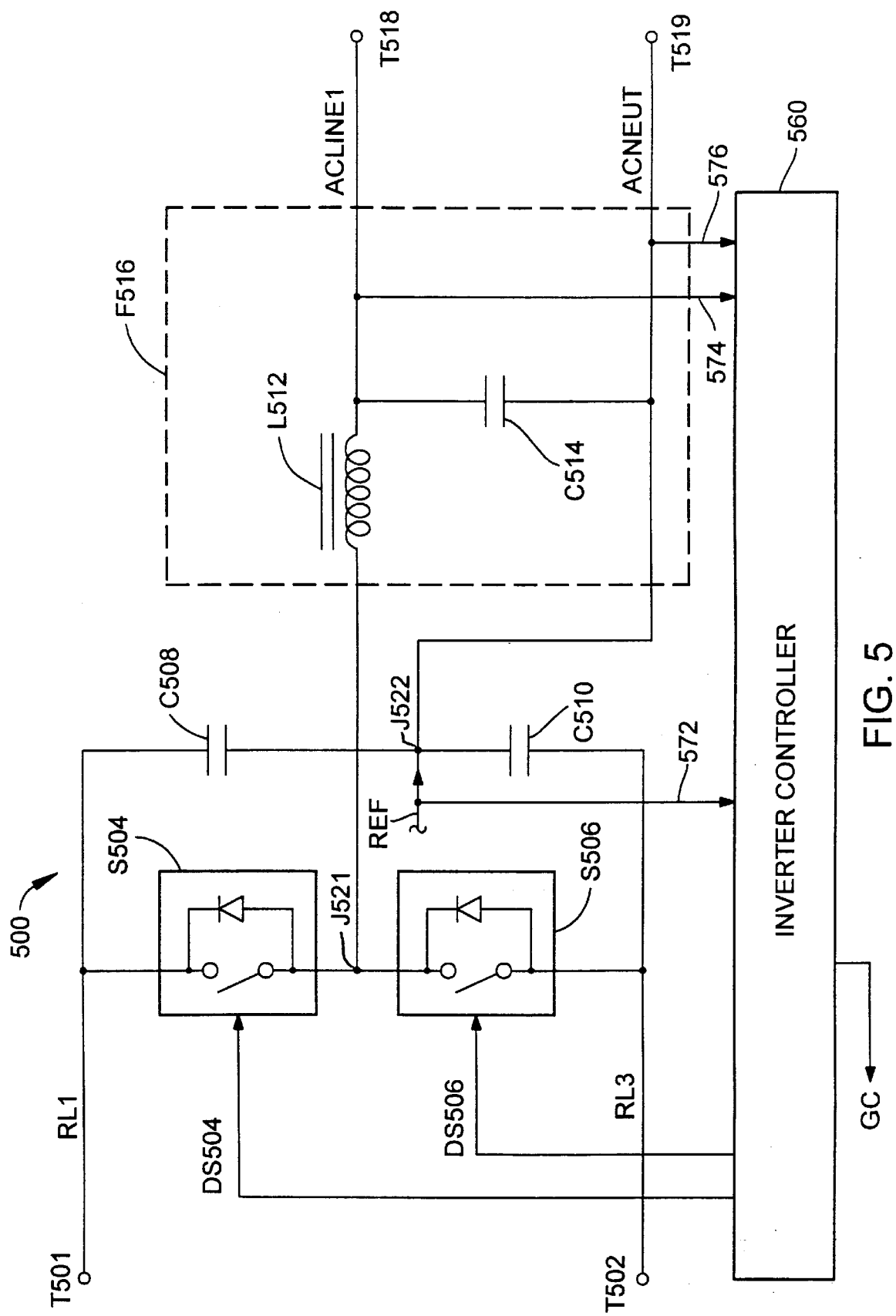
FIG. 5 is a schematic diagram of a single output half-bridge inverter in accordance with aspects of the present invention.

Referring to FIG. 5, inverter circuit 214 suitably includes portion 500 comprising a half-bridge inverter similar to half-bridge inverter 100 of FIG. 1. The structure and function of components in FIG. 5 are generally as described for components numbered less 400 in FIG. 1 except as described below.

In FIG. 5, juncture J522 may receive a reference signal for reducing inverter circuit output voltage drift. Signal REF at juncture J522 may be signal REF1 of FIG. 3, signal REF 2 of FIG. 4, or a suitable combination of reference signals.

Switching devices S504 and S506 may comprise any switching device capable of accommodating the desired inverter circuit output power level and stability, as for example determined by the expected load demand, variation in demand, power factor, and start-up considerations. For example, switching devices S504 and S506 preferably include Insulated Gate Bipolar Transistor (IGBT) switching devices. Switching devices of other types or circuits may be substituted or included, such as, for example: gate turn-off thyristor (GTO), power MOSFET, silicon-controlled rectifier (SCR), thyristor, bi-polar transistor devices, darlington circuits, or an inverse parallel combination of a silicon-controlled rectifier and a diode with appropriate commuting and gating circuits.

Switching devices S504 and S506 are responsive to respective drive signals DS504 and DS506 provided by controller 560. Drive signals selectively render switching devices S504 and S506 conductive on a mutually exclusive basis. When S504 is conductive, S506 is non-conductive, and vice versa. The switching frequency of drive signals DS504 (and similarly DS506) is typically significantly higher than the fundamental frequency (e.g. 60 Hz) of the inverter circuit output voltage. The switching frequency is significant with respect to the choice of the particular switching devices S504 and S506, inverter controller 560, and the frequency filtering characteristics of filter F516. With a lower switching frequency, less expensive switching devices S504 and S506 and controller 204 may meet desired inverter circuit output power and stability requirements. However, the complexity and expense of a passive LC filter for filter F516 tuned to effectively filter out the switching frequency and switching artifacts is inversely proportional to the switching frequency. While use of higher switching frequencies is known, switching devices S504 and S506 are conventionally operated at frequencies in the range of from 500 Hz to 500 KHz, and typically in the range of from 1 to 2.5 KHz (see, e.g., U.S. Pat. No. 4,833,584 issued May 23, 1989 to Divan).

Since juncture J522 receives signal REF, voltage drift is reduced which might otherwise occur due to the problems defined in the discussion of FIG. 1. Accordingly, inverter controller 560, which may be independent or part of system controller 204, receives feedback signals ACLINE1 on line 574 with reference to ACNEUT on line 576, receives signal REF on line 572, and compensates for voltage fluctuation of signal ACLINE1. Examples of control functions of inverter controller 560 and its cooperation with system controller 204 and rectifier controllers 314 or 414 include the following. In response to a change in the voltage of signal ACLINE1, controller 560 may demand a change in rail voltages. This may be effected as a demand for a change in shaft 212 speed via system controller 204 and signals 240 and 222. Alternatively or in addition, inverter controller 560 may change the pulse population or firing angles via signal GC to rectifier controllers 314 or 414. In a variation of inverter circuit 500 where juncture J522 does not receive a reference signal, the pulse duty cycles of PWM drive signals DS504 and DS506 may be increased or decreased to produce an asymmetry in the PWM waveform at juncture J521 to offset a voltage drift at juncture J521. In another variation where juncture J522 receives reference signal REF2 as discussed above, inverter controller 560 may demand, via signal GC on line 440, pulse population modulation or firing angle variation in switching rectifier 414 so as to vary signal REF2 to cancel voltage drift at juncture J522. Or, controller 560 may selectively combine two or more of the aforementioned control techniques. In the event that suitable voltage stability in inverter output voltage cannot be obtained in a prescribed time, controller 560, alone or in cooperation with system controller 204, may record an error condition, provide a warning indication, or initiate system shutdown for personnel and equipment safety.

Figure 6:
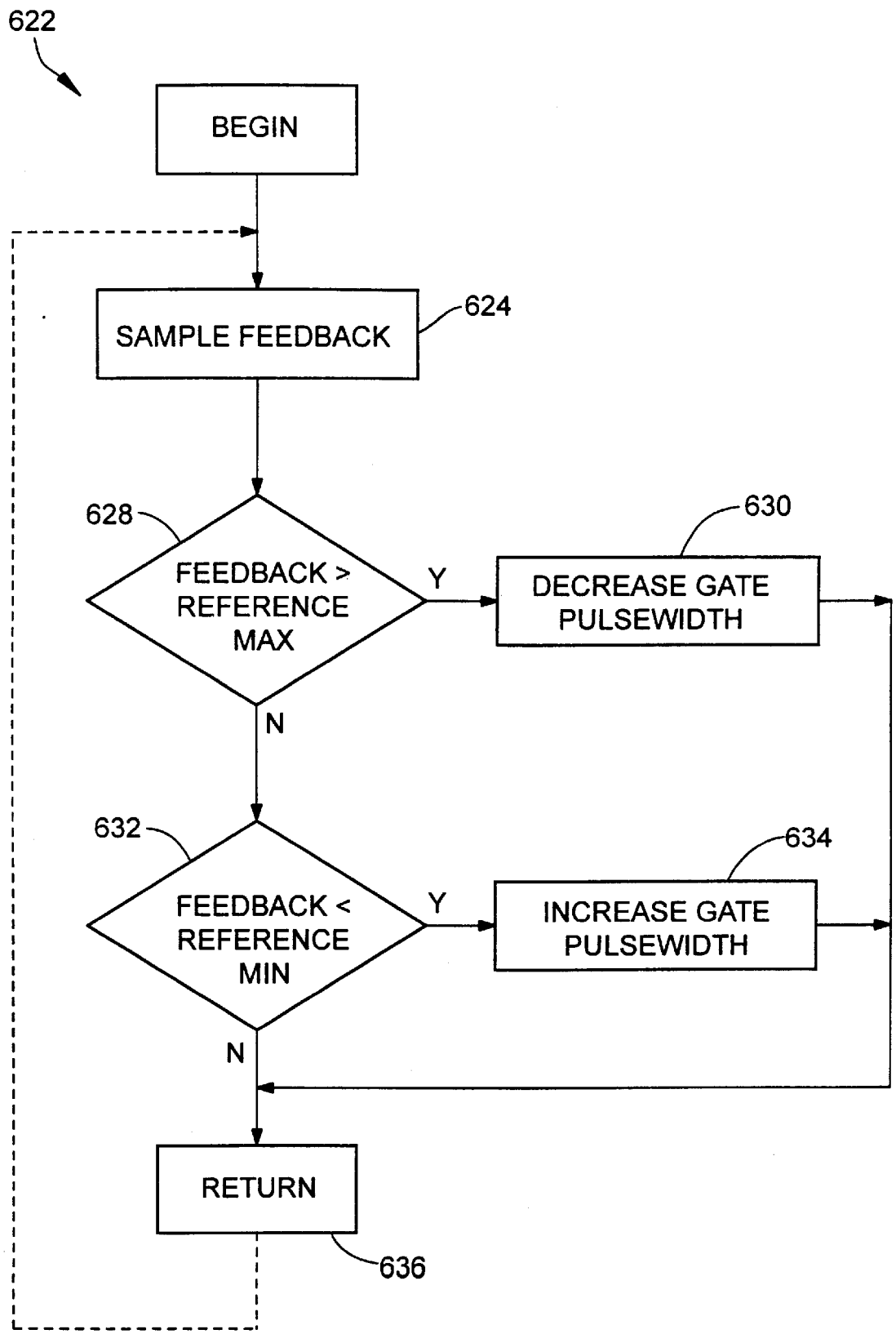
FIG. 6 is a flow chart of a method performed by the rectifier controller of FIGS. 3 and 4, or by the inverter controller of FIG. 5.

Methods of the present invention as described briefly above and in detail in FIG. 6 may be implemented using conventional control software programming languages, conventional control/sequencing circuits, or a combination thereof.

Any of the DC rail voltages or the sinusoidal output voltage may be periodically effected by a suitable drift compensation process (622), for example, as depicted in FIG. 6. Drift compensation process 622 (a subroutine) may be executed one or more times from the main loop of the process effected by rectifier controller 314 or 414, or by inverter controller 560. At step 624, a feedback signal is sampled. For controlling DC rail voltages RL1 and RL3, the feedback signal may be indicative of the voltage at juncture J522 of inverter circuit 500. For controlling the sinusoidal output voltage (ACLINE to ACNEUT), the feedback signal may be indicative of the voltage between lines 574 and 576. When the feedback signal is greater than a first maximum reference value (step 628), the rail voltage is incrementally decreased (step 630) by changing (e.g., decreasing) the pulse width, pulse population, or firing angle of one or more gate signals. When the feedback signal is not greater than the maximum reference value, it is then tested to determine if it is less than a second reference value (step 632). If so, the rail voltage is increased at step 634 by changing (e.g., increasing) the pulse width, pulse population, or firing angle of one or more gate signals.

At step 636, after adjustment (if any), control returns to the main process. Drift compensation process 622 is then repeated during the next traversal of the main process loop. When controlling a DC rail voltage, the voltage drift at juncture J522 is thus reduced and maintained within a desirable range, for example 0±5% of the average DC rail voltage. When controlling the sinusoidal output voltage, variation in the RMS voltage ACLINE to ACNEUT is thus reduced and maintained within a desirable range, for example, ±5%.

In many instances, it is desirable that a small commercial generator set provide multiple output voltages, e.g. 115 volts and 230 volts. A particularly efficient, and relatively inexpensive implementation of system 200 which provides such multiple AC voltages can be effected by adding one or more sets of switching devices and filters to variations of inverter circuit 214. For example, in the variation of FIG. 7, inverter circuit 214 suitably includes portion 700 comprising a half-bridge inverter similar to half-bridge inverter 500 of FIG. 5. The structure and function of components in FIG. 7 are generally as described for components numbered less 200 in FIG. 5 except as described below.

Figure 7:
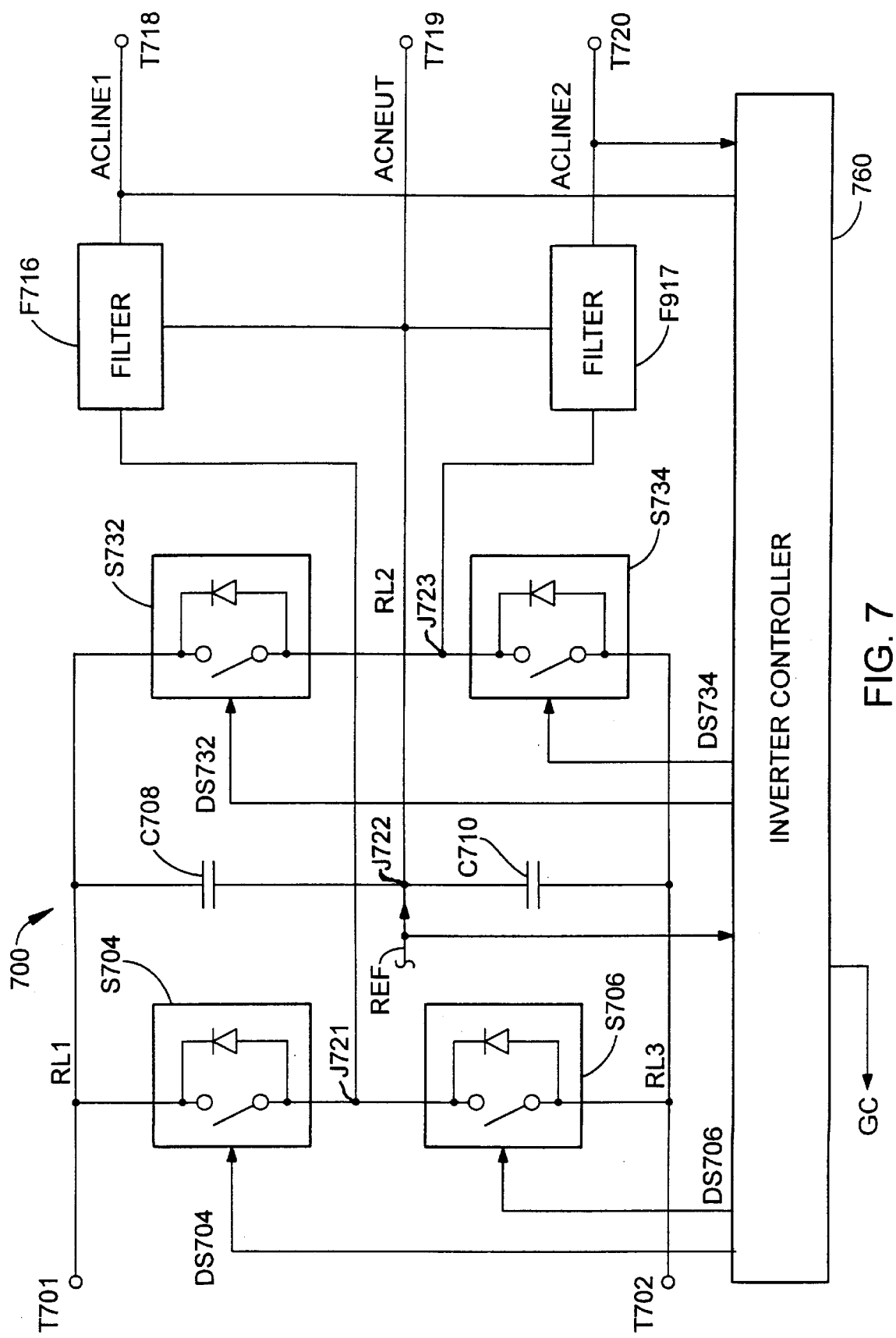
FIG. 7 is a schematic diagram of dual output half-bridge inverter in accordance with aspects of the present invention.

In FIG. 7, a second set of switching devices S732 and S734, suitably similar to switching devices S704 and S706, are connected across capacitors C708 and C710 (between rails RL1 and RL3) defining a further juncture J723, therebetween. A second filter F717, suitably similar to filter F716, is connected between juncture J723 and the common rail RL2 defining a further output terminal T720.

Inverter circuit 700 provides output signal ACLINE1 on terminal T718 with reference to signal ACNEUT on terminal T719 and provides output signal ACLINE2 on terminal T720 also with reference to signal ACNEUT on terminal T719. Juncture J722 may receive a reference signal REF for reducing inverter output voltage drift. Signal REF at juncture J722 may be signal REF1 of FIG. 3, signal REF 2 of FIG. 4, or a suitable combination of reference signals.

In a manner suitably similar to operation of switching devices S704 and S706, switching devices S732 and S734 are responsive to respective drive signals DS732 and DS734 from inverter controller 760 to selectively render switching devices S732 and S734 conductive on a mutually exclusive basis. When switching device S732 is conductive, switching device S734 is non-conductive and vice versa. Accordingly, switching devices S732 and S734 generate a suitable pulse width modulated waveform at output juncture J723 relative to juncture J722. The output signal taken across junctures J723 and J722 is applied to filter F717. The pulse width modulation effected by switching devices S732 and S734 and characteristics of filter F717 are chosen to produce output signal ACLINE2 with a desired sinusoidal output waveform substantially identical to output signal ACLINE1.

Figure 8:
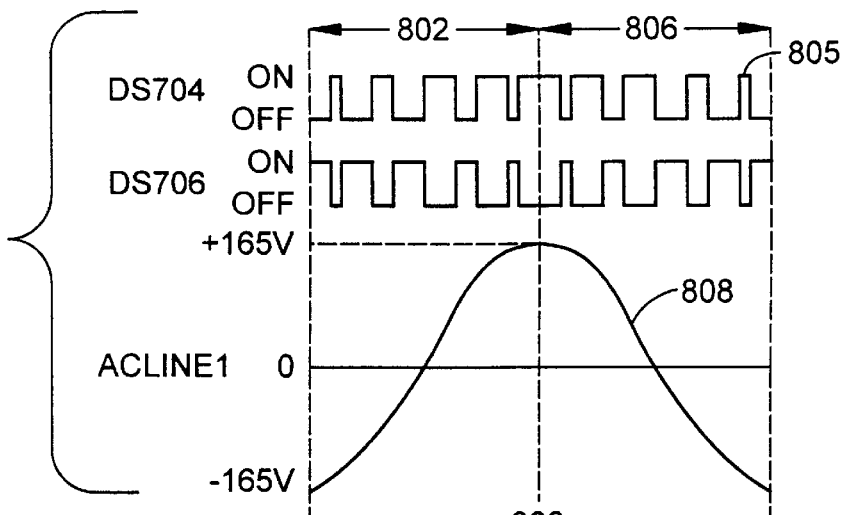
FIGS. 8, 9 and 10 are timing diagrams of signals generated in the operation of an inverter in accordance with aspects of the present invention.

Referring to FIGS. 7 and 8, over the period (generally indicated as 800) corresponding to one cycle 808 of output signal ACLINE1, switching devices S704 and S706 are selectively rendered conductive on a mutually exclusive basis for varying periods of time to generate signal ACLINE1 with a desired amplitude and waveform at output terminals T718 and T719. For clarity, and ease of illustration, FIG. 8 shows many fewer pulses (i.e., a much lower modulation frequency) than would typically be utilized. In practice, the clock frequency employed in pulse width modulation for sine waveform generation is suitably on the order of 20 KHz. As shown in FIG. 8, during a portion (generally indicated as 802) corresponding to a first (e.g. positive going) portion of output signal ACLINE1, switching device S704 is rendered conductive for intervals which are gradually increased in length to a predetermined maximum pulse width (generally indicated as 804). Then, during a portion (generally indicated 806) corresponding to a second (e.g. negative going) portion of output signal ACLINE1 switching device S704 is rendered conductive for intervals which are gradually decreased in length to a predetermined minimum pulse width (generally indicated as 805). Switching device S706 is rendered non-conductive during those intervals when switching device S704 is conductive; i.e. rendered conductive for intervals which are gradually decreased in length during first portion 802, then gradually increased in length during second portion 806. The foregoing description of switching devices S704 and S706 applies analogously to the operation of switching devices S504 and S506 of FIG. 5.

Figure 9:
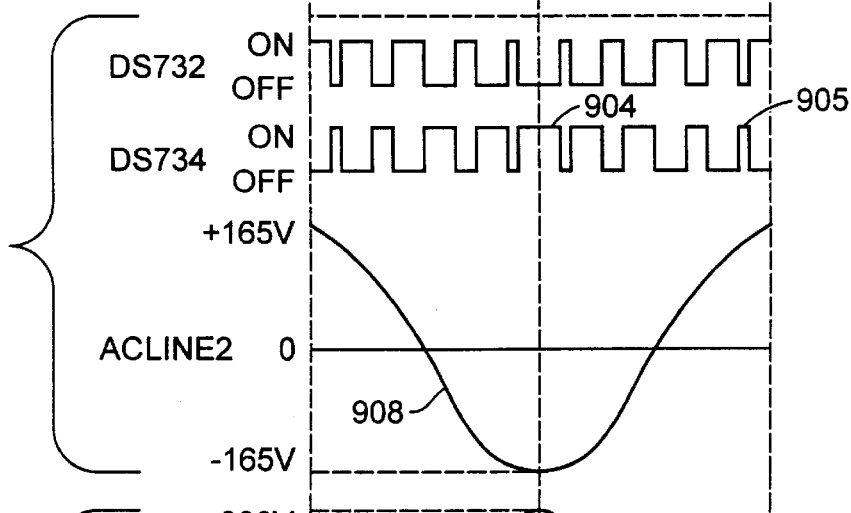

With further reference to FIGS. 7 and 9 over the period (generally indicated as 900) corresponding to one cycle 908 of output signal ACLINE2, switching devices S732 and S734 are selectively rendered conductive on a mutually exclusive basis for varying periods of time to generate signal ACLINE2 with a desired amplitude waveform at output terminals T720 and T719. For clarity, and ease of illustration, FIG. 9 shows many fewer pulses (i.e., a much lower modulation frequency than would typically be utilized. In practice, the clock frequency employed in pulse width modulation for sine waveform generation is suitably on the order of 20 KHz. As shown in FIG. 9, during a portion (generally indicated as 902) corresponding to a first (e.g., negative going) portion of output signal ACLINE2, S734 is rendered conductive for intervals which are gradually increased in length to a predetermined maximum pulse width (generally indicated as 904). Then, during a portion (generally indicated as 906) corresponding to a second (e.g., positive going) portion of output signal ACLINE2, S734 is rendered conductive for intervals which are gradually decreased in length to a predetermined minimum pulse width (generally indicated 905). Switching device S732 is rendered conductive during those intervals when switching device S734 is conductive; i.e. rendered conductive for intervals which are gradually decreased in length during first portion 902, then gradually increased in length during second portion 906.

Switching devices S732 and S734 thus effectively operate 180 degrees out of phase with switching devices S704 and S706, i.e. switches S704 and S732 are conductive on a mutually exclusive basis and switches S706 and S734 are conductive on a mutually exclusive basis. For example, where signals 808 and 908 are of the same waveform and frequency switching devices S704 and S734 are concurrently conductive, and switching devices S706 and S732 are concurrently conductive. Further, my voltage drift at juncture 723 may be reduced by varying the waveform of either or both 808 and 908. A stabilized neutral node T719 results.

Signal ACLINE1 waveform 808 across terminals T718 to T719 is 180 degrees out of phase with signal ACLINE2 waveform 908 across terminals T720 to T719. Line-to-line signal ACLINE1 to ACLINE2 having waveform 1008 across terminals T718 to T720 is, in effect, the difference of the magnitudes of signals 808 and 908. For example, signals 808 and 908, having 165 volts AC peak corresponding to 115 volts RMS, provide a line-to-line signal 1008 of 330 volts AC peak corresponding to 230 volts RMS.

Figure 10:
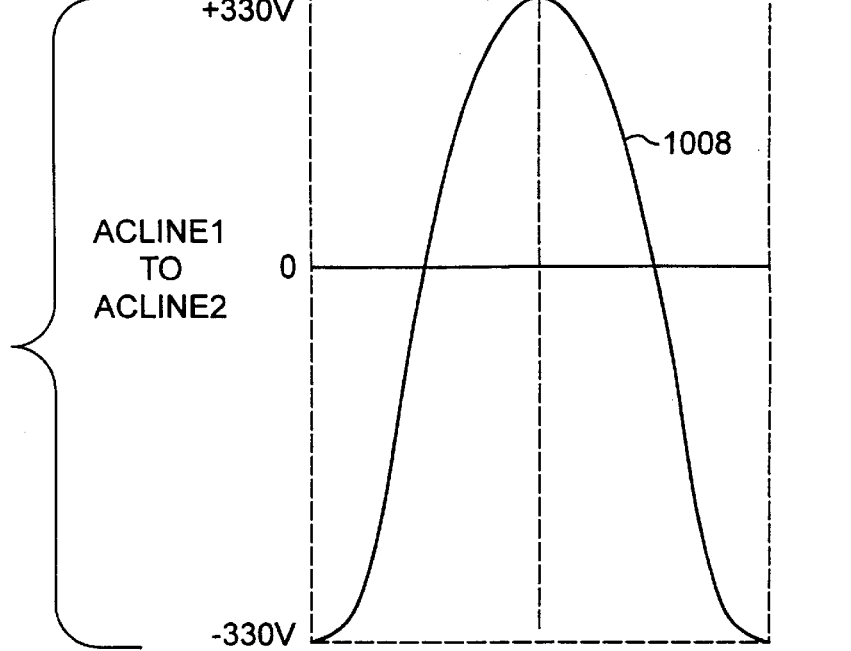
Figure 11:
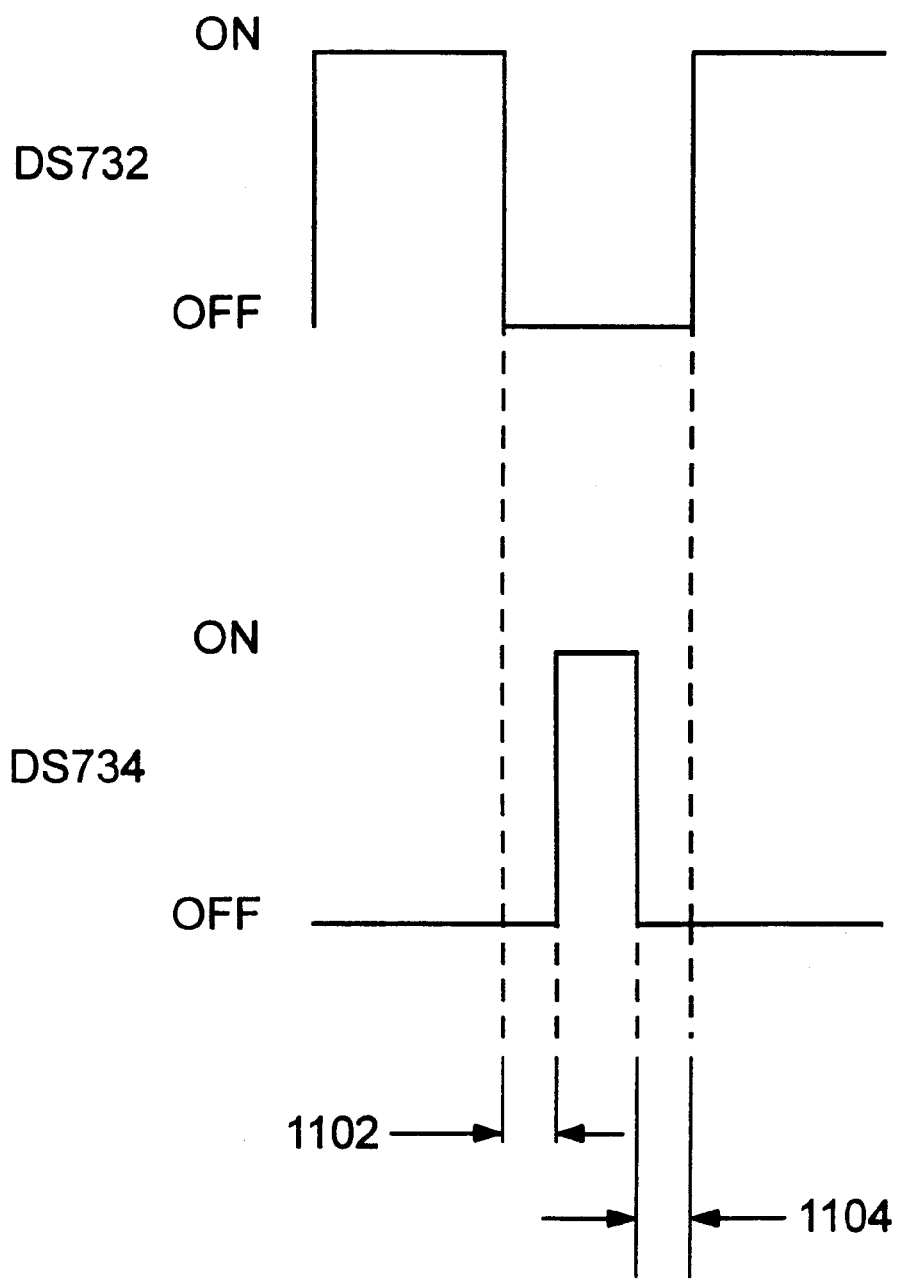
FIG. 11 is a timing diagram of switching device drive signals generated in the operation of an inverter in accordance with aspects of the present invention.

In the operation illustrated in FIGS. 9–11, the voltages of output signals 808 and 908 are equal (e.g., both 115 volts, to provide a combined 230 volts). However, the respective output signals can be, if desired, formed to provide different frequencies, phases, and peak voltage levels. For some combinations of phases and peak amplitudes, voltage drift at juncture J722 does not appear in the output line-to-line voltage. However, in many cases, variation in DC rail voltages RL1 and RL3 will appear in line-to-neutral and line-to-line voltages. Accordingly, it is desirable that the DC rail voltages RL1, RL2 and RL3 be maintained constant.

The voltage of output signals 808 and/or 908 may be varied by changing the pulse width modulation of drive signals for switches S704, S706 and/or S732, S734. For example, the voltage of signal 908, can be reduced by reducing the time periods during which the switching devices are "on." For example, referring to FIG. 11, respective dead times 1102 and/or 1104 may be established, during which neither switch S732 nor switch S734 is conductive to effect a reduction in peak voltage of output signal 908 (FIG. 9).

In the operation illustrated in FIGS. 8–10 (which describe the same instantaneous period of time), the drive signals for the respective sets of switching devices S704, S706 and S752, S734, are formed to provide output signals having the same frequency, facilitating combination of the signals provided across the respective sets of output terminals. In some instances, however, it may be desirable to provide output signals at various frequencies. For example, an air conditioner compressor typically requires a higher current to initiate operation, i.e., when it is cold, than is required during steady state operation, i.e., once it has warmed up. Accordingly, a higher rating generator system than would otherwise be required for ongoing operation is typically utilized to accommodate the increased start-up requirements. However, the need for a higher starting current can be avoided by varying the peak voltage and/or frequency of the inverter circuit output signal used to power the air conditioner compressor in accordance with the temperature of the compressor, e.g. starting the cold compressor with an output signal having a reduced peak voltage and frequency.

In many applications, such as, for example, in recreational vehicles, a generator unit must provide power not only for air conditioning, but also for lights and other appliances. This is readily accomplished utilizing multi-output variations of system 200 such as depicted in FIGS. 1 and 7. In FIG. 7, drive signals for switching devices S704 and S706, for example, may be formed to provide a standard 110 volts 60 Hz signal for lighting appliances. Additionally, drive signals for switching devices S732 and S734 may be formed to provide the power signal for air conditioning described above. For example, referring again to FIGS. 8 and 9, the time periods 800 and 900, each corresponding to a cycle of an output signal. For the multi-output variation discussed above, the time 900 may be extended to decrease the frequency of waveform 908 (to 40 Hz, e.g.) during start-up without affecting the time 800 of waveform 808.

It will be understood that while various elements, components, conductors and connections are shown in the singular or plural, they are not so limited, and may be suitably modified as understood in the art using the teachings of the present invention. Similarly, elements omitted for the sake of clarity in presentation are understood to be present by those of ordinary skill in the art. Although the present invention has been described in conjunction with various exemplary embodiments, the invention is not limited to the specific forms shown, and it is contemplated that other embodiments of the present invention may be created without departing from the spirit of the invention. Variations in components, materials, values, structure, elements, and other aspects of the design and arrangement may be made in accordance with the present invention as expressed in the following claims.

What is claimed is:

1. An apparatus comprising:
   a generator including a rotor and a stator, said stator including a first stator winding disposed such that movement of the rotor induces a current in the stator winding;
   a motive source for effecting movement of the rotor;
   a rectifier circuit, response to the current induced in the first stator winding, for generating a uni-polar rail voltage between a relatively positive rail and a relatively negative rail;
   an inverter circuit comprising:
      first and second switching devices, responsive to control signals applied thereto, connected in series between the relatively positive rail and the relatively negative rail, with a nominal first juncture therebetween;
      first and second capacitors, connected in series between the relatively positive rail and the relatively negative rail, with a nominal second juncture therebetween; and
      a filter coupled across the first and second junctures; and
   a controller for generating the control signals to the inverter circuit switching devices such that the switching devices are rendered conductive and non-conductive to selectively connect one or the other of the relatively positive and relatively negative rails to the first juncture and generate a pulse width modulated signal at the first juncture relative to the second juncture such that the filter operates upon the pulse width modulated signal to provide an output signal having a desired waveform; wherein the controller maintains, in steady state operation, a DC voltage at the second juncture at a substantially constant predetermined value relative to the relatively positive and relatively negative rails.

2. The apparatus of claim 1 wherein:
   the generator further comprises a second stator winding disposed such that the movement of the rotor induces a second current in the second stator winding;
   the rectifier circuit includes first and second rectifier bridges, receptive of the currents induced in the first and second stator windings, respectively, the rectifier bridges being connected between said relatively positive and relatively negative rails and providing an intermediate rail voltage between an intermediate rail and the relatively negative rail; and
   the controller comprises an electrical connection between the intermediate rail and the second juncture.

3. The apparatus of claim 2 wherein:
   the first and second stator windings are each multiphase windings with the corresponding phases thereof in phase with each other;
   the first and second rectifier bridges each include a respective switching device corresponding to each phase of the stator windings; and
   the controller generates common control signals to the corresponding switching devices of the first and second bridges.

4. The apparatus of claim 1 wherein:
   the first stator winding comprises a multiphase winding, the respective phases thereof being connected at a neutral point;
   the rectifier circuit comprises a full controlled rectifier bridge; and
   the controller comprises an electrical connection between the neutral point and the second juncture.

5. The apparatus of claim 1 wherein:
   the rectifier circuit comprises a controlled rectifier bridge, responsive to control signals applied thereto; and
   the apparatus further comprises a feedback link to the controller of a signal indicative of the DC voltage at the second juncture relative to one of the rails, and
   the controller generates control signals to the controlled rectifier bridge to vary the average voltage between the relatively positive and relatively negative rails to compensate for variation in the DC voltage at the second juncture.

6. The apparatus of claim 1 wherein:
   the inverter circuit further comprises:
      third and fourth switching devices, responsive to control signals applied thereto, connected in series between the relatively positive rail and the relatively negative rail, with a nominal third juncture therebetween; and
      a second filter coupled across the second and third junctures; and
   the controller further generates the control signals to the third and fourth inverter circuit switching devices such that the switching devices are rendered conductive and non-conductive to selectively connect one or the other of the relatively positive rail and the relatively negative rail to the third juncture and generate a pulse width modulated signal at the third juncture relative to the second juncture such that the second filter operates upon the pulse width modulated signal to provide a second output signal having a desired waveform.

7. The apparatus of claim 6 wherein:

the generator further comprises a second stator winding disposed such that the movement of the rotor induces a second current in the second stator winding;

the rectifier circuit includes first and second rectifier bridges, receptive of the currents induced in the first and second stator windings, respectively, the rectifier bridges being connected between said relatively positive and relatively negative rails and providing an intermediate rail voltage between an intermediate rail and the relatively negative rail; and the controller comprises an electrical connection between the intermediate rail and the second juncture.

8. The apparatus of claim 7 wherein:

the first stator winding comprises a multiphase winding, the respective phases thereof being connected at a neutral point;

the rectifier circuit comprises a full controlled rectifier bridge; and the controller comprises an electrical connection between the neutral point and the second juncture.

9. The apparatus of claim 6 wherein:

the rectifier circuit comprises a controlled rectifier bridge, responsive to control signals applied thereto; and the apparatus further comprises a feedback link to the controller of a signal indicative of the DC voltage at the second juncture relative to one of the rails, and the controller generates control signals to the controlled rectifier bridge to vary the average voltage between the relatively positive and relatively negative rails to compensate for variation in the DC voltage at the second juncture.

\* \* \* \* \*